United States Patent [19]

Parsons

[11] Patent Number: 4,813,273
[45] Date of Patent: Mar. 21, 1989

[54] TURBOMACHINE TIP CLEARANCE SENSOR

[75] Inventor: Jonathan M. Parsons, Somerset, England

[73] Assignee: Rolls-Royce plc, London, England

[21] Appl. No.: 190,398

[22] Filed: Apr. 27, 1988

[30] Foreign Application Priority Data

May 14, 1987 [GB] United Kingdom ............... 8711326

[51] Int. Cl.$^4$ ........................................... G01M 15/00
[52] U.S. Cl. ...................................... 73/118.1; 73/660
[58] Field of Search .................... 73/118.1, 116, 660; 340/679; 324/61 R, 61 P

[56] References Cited

U.S. PATENT DOCUMENTS 2,575,710 11/1951 Hardigg ............................... 73/660
2,842,738 7/1958 Warnick ............................ 324/61 R Primary Examiner—Jerry W. Myracle
Attorney, Agent, or Firm—Parkhurst, Oliff & Berridge

[57] ABSTRACT

An axially extending electrode (16) is provided on a casing liner (10) such that a capacitor is formed, with rotor blades constituting the other electrode, and the tip clearance therebetween forming a dielectric. The axial length of the electrode (16) exceeds that swept by the rotor blade tips and is sufficient for any axial movement of the rotor blades under operating conditions not to affect the capacitance of the sensor.

3 Claims, 1 Drawing Sheet

U.S. Patent  Mar. 21, 1989  4,813,273
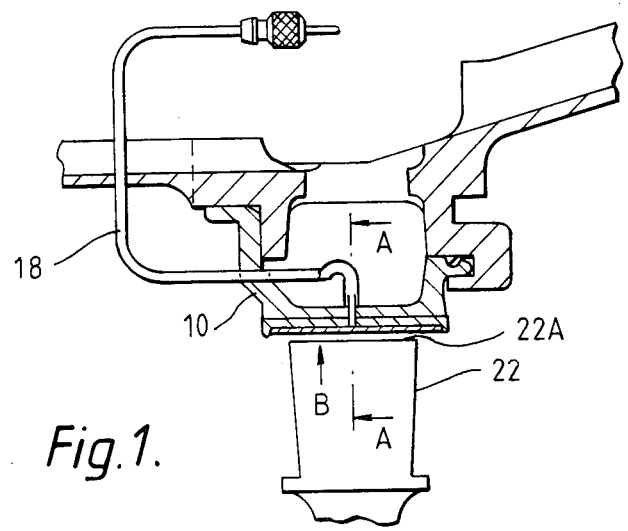
Fig.1.
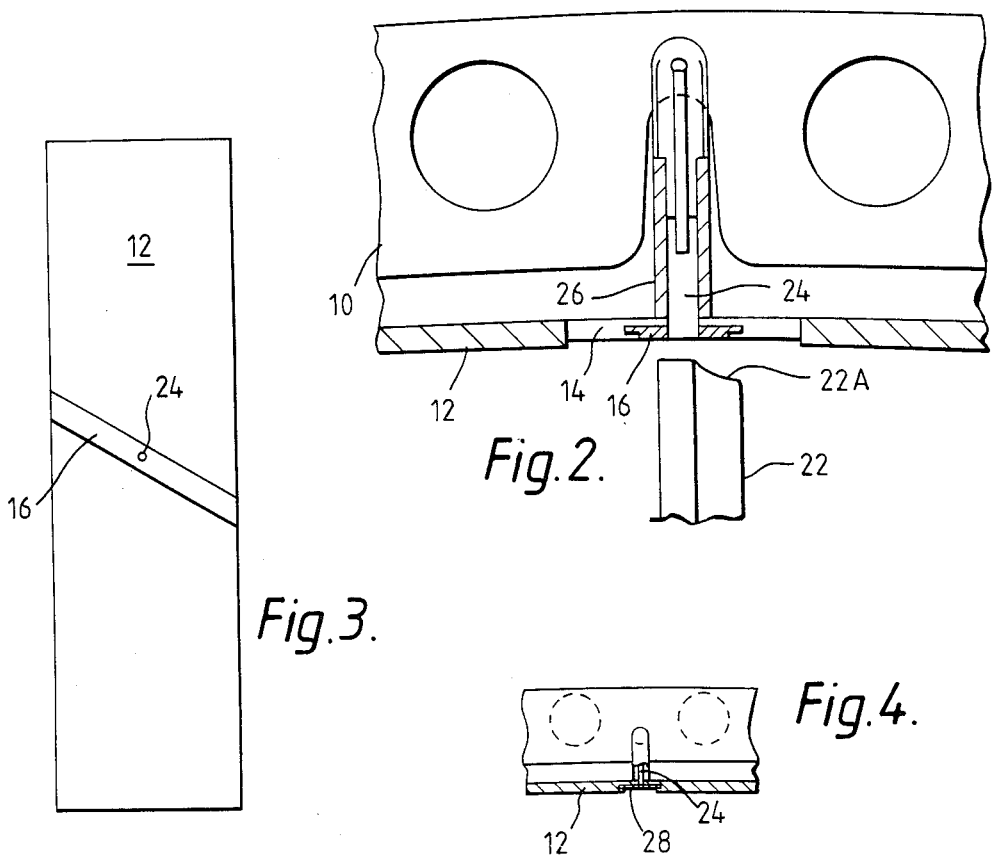
Fig.2.
Fig.3.
Fig.4.

TURBOMACHINE TIP CLEARANCE SENSOR

This invention relates to a turbomachine tip clearance sensor. More particularly a sensor for determining the running clearance between a casing liner and an array of rotor blades utilising the property of capacitance.

Capacitance probes are already used to determine tip clearance where a relatively small round electrode, attached to a turbomachine casing liner, 'looks' over a small part of an array of rotor blade tips as they pass by the electrode. In practice the rotor blades move axially under operating conditions which causes the electrode to look over differing portions of the blade tips which have different dimensions. The axial movement of the rotor blades therefore affects the capacitance reading. This effect can be mitigated by calibrating the probe for various axial positions of the rotor blades relative to the casing liner. But the relative axial position of the rotor blades bas to be known during running necessitating a second probe solely for this purpose. Alternatively, in practice, one may accept the error or estimate the axial position of the rotor blades.

This invention seeks to provide an improved turbomachine tip clearance sensor which is unaffected by axial movement of the rotor blades.

According to the invention a turbomachine tip clearance sensor comprises a casing liner radially spaced from an array of rotor blades and an axially extending electrode provided on the liner and insulated therefrom by a layer of insulating material whereby the electrode and array of rotor blades constitute a capacitor with a dielectric tip clearance gap therebetween, and wherein the axial length of the electrode exceeds that swept by the radially outer tips of the rotor blades to thereby substantially prevent axial movement of the rotor blades, under operating conditions, from affecting the capacitance of the sensor.

The invention will now be described by way of an example or examples with reference to the accompanying drawings in which:

FIG. 1 depicts a section through a turbomachine casing liner provided with a sensor according to the present invention;

FIG. 2 depicts an enlarged partial section in the direction of arrows AA in FIG. 1;

FIG. 3 depicts a view in the direction of arrow B in FIG. 1:

FIG. 4 depicts a section through a turbomachine casing liner provided with a modified sensor according to the invention.

Referring to FIGS. 1 to 3, a casing liner 10 has an abradable lining 12 which is interrupted by an insulating layer 14 of a ceramic material that has been sprayed on to the casing liner.

An electrode 16 is inserted on to the insulating layer and is polarised with a DC voltage from a co-axial cable 18.

The rotor blades 22 form the other electrode of the capacitor and the gap between the electrode 16 on the casing liner, and the rotor blades forms the dielectric and is the tip clearance which is to be measured under operating conditions.

The electrode 16 extends axially along the casing liner 10 for a distance in excess of the axial length swept by the rotor blade tips 22A so that any axial movement of the rotor blades under operating conditions does not effect the capacitance of the sensor. The axial length of the electrode 16 will therefore equal, or exceed the axial length of the rotor blade tips 22A plus the maximum possible axial movement of the rotor blades. Thus the capacitance of the sensor will only depend on the radial tip clearance gap between the rotor blade tips and the electrode on the casing liner.

In FIGS. 1 to 3 the casing liner electrode 16 is a thin conductive insert and a conductive pin 24 connects the electrode to the co-axial cable 18. The pin 24 is insulated from the by a ceramic sleeve insulator 26. Alternately, the cable may be extended so that a central wire of the co-axial cable is connected to the electrode directly. The insert may be platinum with 10% rhodium.

The tip clearance sensor can be first calibrated off the turbomachine to give a relationship between tip clearance and capacitance and then installed in the turbomachine (in place of a standard casing liner. A FM voltage may be used instead of a DC voltage if a tri-axial cable is used. The electrical circuitry required to represent the tip clearance is not described here as it is already well known in the art.

In FIG. 4 a sprayed on electrode 28 replaces the thin insert. The term "casing liner" refers to any form of housing which defines a generally circular duct surrounding an array of rotor blades.

I claim:

1. A turbomachine tip clearance sensor comprising a casing liner radially spaced from an array of rotor blades and an axially extending electrode provided on the liner and insulated therefrom by a layer of insulating material whereby the axially extending electrode and array of rotor blades constitute a capacitor with a dielectric tip clearance gap therebetween, and wherein the axial length of the electrode exceeds that swept by the radially outer tips of the rotor blades thereby substantially to reduce axial movement of the rotor blades, under operating conditions, from affecting the capacitance of the sensor.

2. A turbomachine tip clearance sensor according to claim 1 wherein the layer of insulating material is a ceramic which is sprayed on to the casing liner.

3. A turbomachine tip clearance sensor according to claim 1 wherein the electrode is sprayed on to the casing liner.

* * * * *